(12) United States Patent
Rubin

(10) Patent No.: US 7,322,748 B1
(45) Date of Patent: Jan. 29, 2008

(54) INSULATED FOOD CONTAINER

(76) Inventor: Richard Rubin, 410 Hopkins St., Rio Rico, AZ (US) 85648

( * ) Notice: Subject to any disclaimer, the term of this patent is extended or adjusted under 35 U.S.C. 154(b) by 674 days.

(21) Appl. No.: 09/664,885

(22) Filed: Sep. 19, 2000

(51) Int. Cl.
- *B65D 33/08* (2006.01)
- *B65D 33/00* (2006.01)
- *B65D 33/01* (2006.01)
- *B65D 33/02* (2006.01)

(52) U.S. Cl. ............... 383/110; 383/95; 383/100; 383/113; 383/119

(58) Field of Classification Search ........ 383/110, 383/907, 43, 95, 100, 113, 119; 206/308.1, 206/313; 150/150
See application file for complete search history.

(56) References Cited

U.S. PATENT DOCUMENTS

| | | | | |
|---|---|---|---|---|
| 1,479,136 A * | 1/1924 | Guinzburg | ............... | 383/907 |
| 1,600,633 A * | 9/1926 | Hildebrand | ............... | 150/150 |
| 2,051,092 A * | 8/1936 | Landis | ............... | 383/907 |
| 2,541,002 A * | 2/1951 | Wells | ............... | 383/110 |
| 2,575,893 A * | 11/1951 | Seaman | ............... | 383/907 |
| 2,667,906 A * | 2/1954 | Stiller | ............... | 150/150 |
| 2,681,296 A * | 6/1954 | Dobbs et al. | ............... | 383/907 |
| 2,822,848 A * | 2/1958 | Thoms | ............... | 150/161 |
| 2,837,132 A * | 6/1958 | Daust | ............... | 383/110 |
| RE24,600 E * | 2/1959 | Ziff | ............... | 383/33 |
| 2,960,136 A * | 11/1960 | Ziff | ............... | 383/34 |
| 3,428,103 A * | 2/1969 | Walsh | ............... | 206/545 |
| 4,211,091 A * | 7/1980 | Campbell | ............... | 383/110 |
| 4,343,158 A * | 8/1982 | Campbell | ............... | 383/110 |
| 4,503,560 A * | 3/1985 | Bourne | ............... | 383/907 |
| 4,537,313 A * | 8/1985 | Workman | ............... | 206/545 |
| 4,802,233 A * | 1/1989 | Skamser | ............... | 383/110 |
| 4,919,300 A * | 4/1990 | Anderson et al. | ............... | 206/521 |
| 4,929,094 A * | 5/1990 | Becker | ............... | 383/110 |
| 5,076,711 A * | 12/1991 | Koehler, Jr. | ............... | 383/67 |
| 5,237,838 A * | 8/1993 | Merritt-Munson | ............... | 383/110 |
| 5,361,603 A * | 11/1994 | Merritt-Munson | ............... | 220/592.25 |
| 5,464,969 A | 11/1995 | Miller | | |
| 5,472,281 A * | 12/1995 | Phelps | ............... | 150/150 |
| 5,499,743 A * | 3/1996 | Blumenkron | ............... | 383/110 |
| 5,692,660 A * | 12/1997 | Stewart | ............... | 224/581 |
| 5,756,976 A | 5/1998 | Akasaka | | |
| 5,775,530 A * | 7/1998 | Attaway | ............... | 206/522 |
| 5,826,717 A * | 10/1998 | Eskandry | ............... | 206/308.1 |
| 5,967,390 A * | 10/1999 | Goryl | ............... | 224/153 |
| 6,054,698 A | 4/2000 | Mast | | |
| 6,102,568 A * | 8/2000 | Davis | ............... | 383/43 |
| 6,139,188 A * | 10/2000 | Marzano | ............... | 383/110 |
| 6,238,091 B1 * | 5/2001 | Mogil | ............... | 383/110 |

* cited by examiner

*Primary Examiner*—Jes F. Pascua
(74) *Attorney, Agent, or Firm*—Parsons & Goltry; Robert A. Parsons; Michael W. Goltry

(57) ABSTRACT

Apparatus for storing food and for keeping it warm and moist comprising a substantially water impermeable pouch that bounds an insulated food warming chamber, the pouch having opposing substantially coextensive lips capable of being moved apart for providing passage to the warming chamber and for providing a partial vapor lock for inhibiting moisture from building up in the warming chamber.

15 Claims, 2 Drawing Sheets

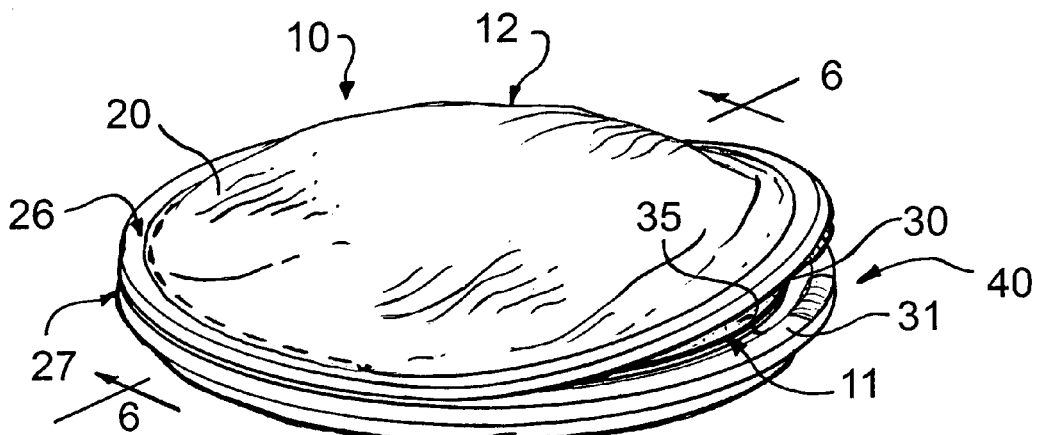
FIG. 1
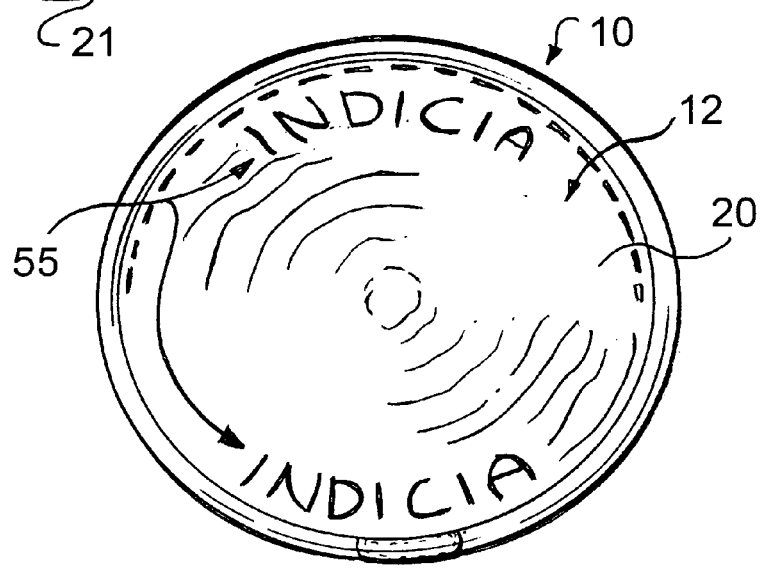
FIG. 2
FIG. 3
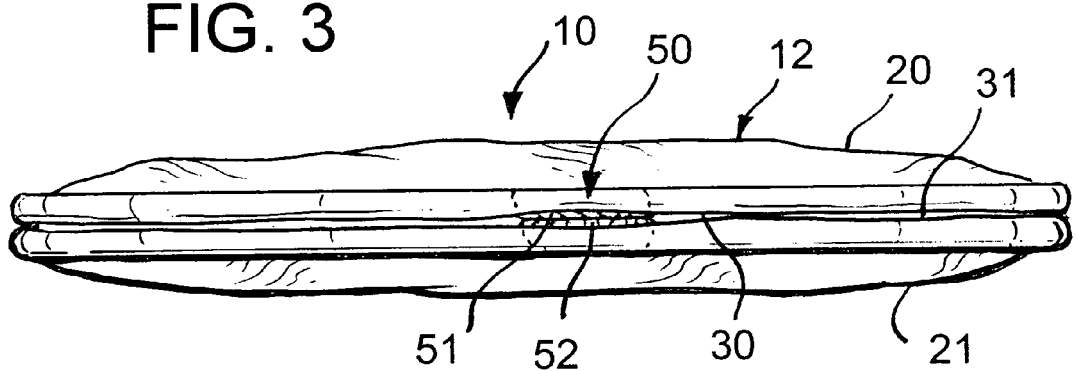

US 7,322,748 B1

INSULATED FOOD CONTAINER

FIELD OF THE INVENTION

This invention relates to food storage devices and, more particularly, to containers for keeping food warm and moist.

BACKGROUND OF THE INVENTION

Most people enjoy eating warm tortillas, bread, rolls, cookies and other savory and sweet breads and bread-like foods. However, if freshly baked or warmed food such as these are left out, they quickly dry out and become cold. In an attempt to keep warm and moist freshly baked and warmed breads and bread-like foods, most people store them in sealed containers such as plastic bags and plastic containers with tight-fitting lids. However, freshly baked or heated bread and bread-like food gives off moisture in the form of water vapor, which invariable builds up in sealed containers and makes them soggy and unpalatable. Given the lack of containers that are constructed to keep food warm and moist, there is a need for such a container that is easy to use and construct and that keeps food warm and moist without allowing it to become soggy over an extended period of time.

SUMMARY OF THE INVENTION

The above problems and others are at least partially solved and the above purposes and others realized in new and improved apparatus for storing food and for keeping it warm and moist. In a preferred embodiment, the apparatus of the invention comprises a substantial pouch that bounds an insulated and substantially water impermeable food-warming chamber. The pouch includes opposing substantially coextensive lips capable of being moved apart for providing food passage to the warming chamber and for providing a partial vapor lock for the warming chamber. When warm food is placed into the warming chamber, it is kept warm. Warm food, such as warm tortillas and sweet and savory bread and bread-like food give off water vapor. The partial vapor lock allows water vapor to pass between the lips, which inhibits moisture from building up in the warming chamber and the food stored therein from becoming soggy. Because the vapor lock is only partial, it also ensures that the food stored in the warming chamber remains moist.

The warming chamber is insulated with insulating structure. In one embodiment, the insulating structure comprises a substantial pouch formed of joined superimposed layers of cloth and insulating material. In another embodiment, the insulating structure comprises opposing and partially joined insulators each comprising joined superimposed layers of cloth and insulating material. A closure is provided for actively and partially coupling together the lips. The closure comprises an engagement element supported by one of the lips and an opposing and detachably engagable complemental engagement element supported by the other of the lips.

Consistent with the foregoing, the invention also contemplates associated methods.

BRIEF DESCRIPTION OF THE DRAWINGS

Referring to the drawings:

FIG. 1 is a perspective view of apparatus for keeping food warm and moist;

FIG. 2 is a top view of the apparatus of FIG. 1;

FIG. 3 is a side view of the apparatus of FIG. 1;

DETAILED DESCRIPTION OF A PREFERRED EMBODIMENT

Figure 6:
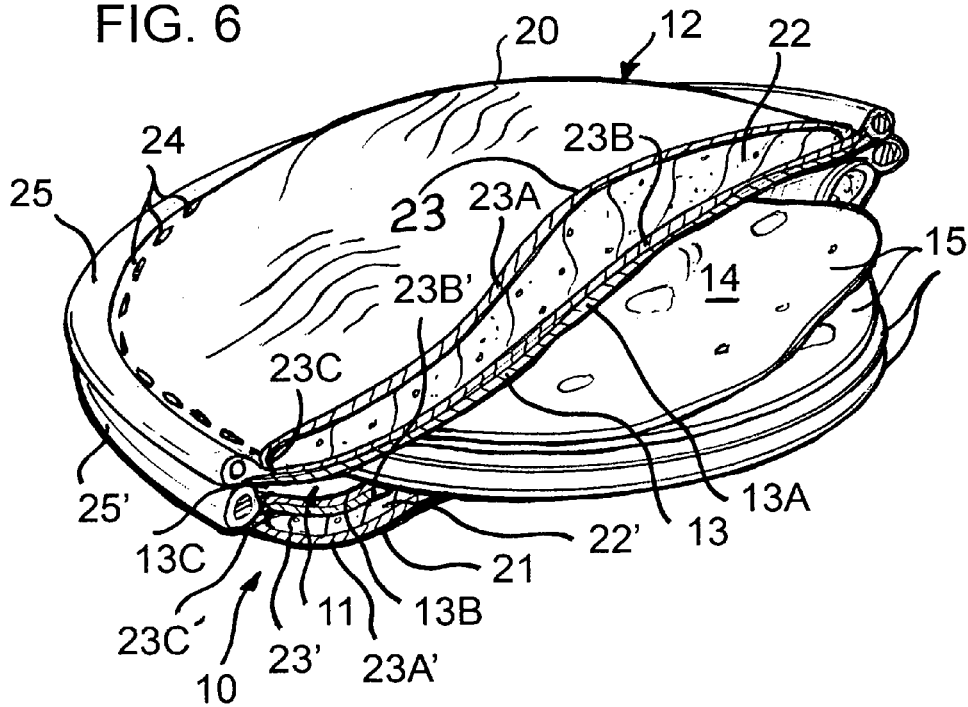
FIG. 6 is a sectional view along line 6-6 of FIG. 1.

Referring to the drawings, FIG. 1 is a perspective view of apparatus 10 for storing food and for keeping it warm and moist without letting it get soggy, in accordance with the invention. Looking to FIG. 6, which illustrates a sectional view along line 6-6 of FIG. 1, apparatus 10 is comprised of a substantial pouch 11 and insulating structure 12 that are together pliant and easily manipulated by hand and washable. In terms of this disclosure, the term "pouch" is given its ordinary and customary structural meaning. In this regard, pouch 11 is a general bag or baglike item comprising a substantially continuous sidewall 13 that includes a closed end and an opposing open end (not shown in FIG. 6, but is contained substantially by insulating structure 12) and a chamber 14 therebetween for receiving and accommodating food that, in this specific example, is shown as tortillas 15 as a matter of example. Insulating structure 12 supports and substantially encloses pouch 11, and pouch 11 is constructed of a substantially water-impermeable material such as thin plastic or polyester film or the like. As a matter of explanation and detail, sidewall 13 is more specifically comprised of opposing, spaced-apart layers 13A and 13B that meet at a continuous edge 13C.

Referring back to FIG. 1, insulating structure 12 is generally circular, which is preferably also the case with pouch 11. Other shapes may be employed whether ovoidal, triangular, square, etc., and insulating structure 12 and pouch 11 may be of different shapes. Insulating structure 12 is comprised of a substantial pouch that, in this specific embodiment, is defined by joined substantially coextensive elements or insulators 20 and 21 and it alternatively may be formed from or of a single element. In this preferred embodiment, elements 20 and 21 are joined at their respective distal extremities and this will be discussed more fully later in this specification, and are substantially identical and only one will be discussed in connection with FIG. 6. In this regard, element 20 is comprised of insulation or insulating material 22 contained substantially in a substantial shell 23. Insulation 22 is constructed of natural and/or synthetic insulating material such as polyester and/or cotton or other suitable insulating material or combination of materials and may be constructed of any suitable thickness for providing a desired insulating ability. Shell 23 includes opposing, spaced-apart layers 23A and 23B that meet at a substantially continuous edge 23C. Shell 23 is preferably constructed of a natural and/or synthetic, woven and/or unwoven cloth or cloth-like material. Layers 23A and 23B and insulation 22 are considered engaged or otherwise joined, superimposed layers, and layer 23B directly opposes and is substantially coextensive with layer 13A of pouch 11. In another embodiment, the inner surface of layer 13A that faces and at least partially defines chamber 14 may be equipped or otherwise associated with a cloth or cloth-like layer. Layers 23A and 23B are joined with an adhesive and/or with sewn features 24 as shown for the purposes of example, and edge 23C is reinforced with a continuous bead 25, which prevents the free edges of layers 23A and 23B from fraying and this may be accomplished in other ways such as with sewn reinforcements, glue, etc. In another embodiment, bead 25 may comprise the structure for engaging the free edges of layers 23A and 23B together. Given that element 21 is substantially identical to element 20, element 21 is denoted with the same reference numerals used to describe element 20 and they are each accompanied with a prime ("'") symbol for clarity. Edges 23C and 23C' substantially oppose each other and define generally the opposing and substantially continuous distal extremities of elements 20 and 21, respectively. In FIG. 1, the substantially continuous distal extremity of element 20 is denoted generally at 26, and the opposing and substantially continuous distal extremity of element 21 is denoted generally at 27.

Pouch 11 may be prefabricated, and elements 20 and 21 may be prefabricated and then joined together and to pouch 11. In another embodiment, element 20 may be prefabricated with layer 13A and element 21 may be prefabricated with layer 13B. These prefabricated structures may then be joined together for forming apparatus 10 including pouch 11. Elements 20 and 21 are joined together with a suitable adhesive and/or sewn features, which may comprise sewn features 24 discussed in connection with FIG. 6 and which are also shown in FIG. 1 or different sewn features.

In a further and more specific aspect in regards to FIG. 1, elements 20 and 21 are joined together substantially at and along only a portion of extremities 26 and 27. This leaves other portions of the extremities 26 and 27 free, and these free portions of extremities 26 and 27 define opposing and substantially coextensive lips 30 and 31, respectively. Lips 30 and 31 loosely associate or otherwise mingle with one another and are capable of being easily pulled apart for forming an opening 35, which leads to chamber 14 (chamber 14 shown only in FIG. 6). Food passage to chamber 14 may also be provided by another sealable opening of apparatus 10 if desired.

The open end of pouch 11 is formed by opposing and substantially coextensive lips of sidewall 13, which are each preferably engaged to one of elements 20 and 21 by adhesive or sewing or the like. The lips of sidewall 13 are preferably substantially coextensive with and positioned substantially along lips 30 and 31. As a result, the open end of pouch 11 is directed toward and otherwise generally common with lips 30 and 31 and opening 35 defined thereby. In this regard, the open end of pouch 11 and opening 35 defined by lips 30 and 31 generally define the open end of apparatus 10, which is denoted generally in FIG. 1 with the reference character 40. The lips that define the open end of pouch 11 can be shallow of lips 30 and 31 if desired. Lips 30 and 31 are constructed and arranged so that they normally loosely associate or mingle with one another or otherwise rest against one another passively. By pulling elements 20 and 21 apart at lips 30 and 31, opening 35 may be enlarged for allowing a user to pass food therethrough and into chamber 14.

In operation, a user may take warm food such as warm tortillas, bread, rolls or other savory or sweet bread or bread-like food, pull lips 30 and 31 apart and pass the food into chamber 14 through opening 35 and through the open end of pouch 11. By releasing lips 30 and 31, they naturally come together and rest against one another as generally shown in FIG. 3. Insulating structure 12 keeps the food contained in chamber 14 warm. Because the engagement between lips 30 and 31 is a non-sealing engagement, and because pouch 11 is open, water vapor generated by the warm food is able to pass from pouch 11 and outwardly between opening 35 between lips 30 and 31 as it builds up in chamber 14. In this regard, opening 35 is never completely sealed and this provides a partial vapor lock for chamber 14. This partial vapor lock inhibits moisture from building up in chamber 14 for inhibiting the food contained therein from becoming soggy, yet allows enough moisture vapor to remain therein for keeping the food moist.

Figure 5:
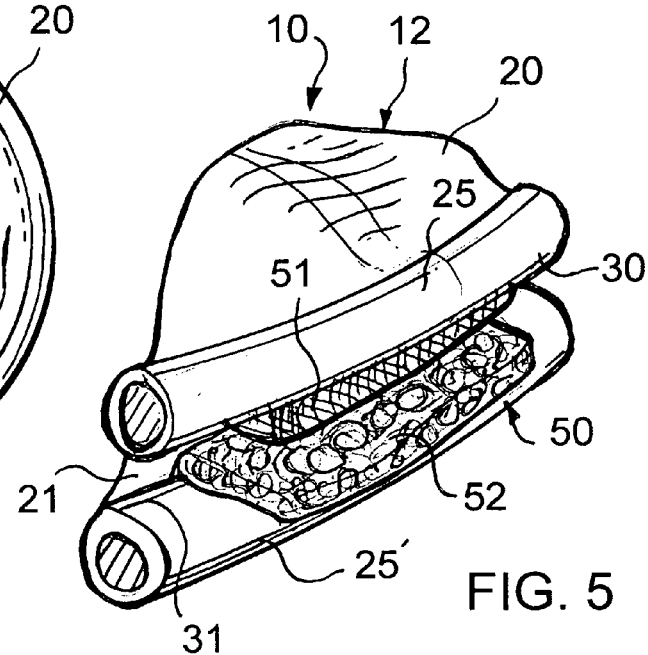
FIG. 5 is an enlarged fragmented perspective view of a closure for an opening of the apparatus of FIG. 1.

As a matter of convenience, lips may be partially and mechanically or actively closed at a discrete point with a closure 50 shown generally in FIGS. 3 and 5. Closure 50 is comprised of an engagement element 51 supported by or otherwise fixed to or adjacent lip 30 and an opposing and detachably engagable complemental engagement element 52 supported by or otherwise fixed to or adjacent lip 31. In a preferred embodiment, engagement element 51 comprises one of a hook medium and a loop medium commonly found under the VELCRO trademark and complemental engagement element 52 comprises the other of the hook medium and the loop medium and this may be reversed. Those of ordinary skill will appreciate that lips 30 and 31 may employ a snap or button fastener or other suitable form of closure. The ability to actively or otherwise positively or mechanically fasten lips 30 and 31 together at a discrete point is helpful for inhibiting the contents of chamber 14 from falling out during transport. Depending on the size of apparatus 10, lips 30 and 31 may be provided with closure structure for fastening lips 30 and 31 together at spaced apart points, while leaving other parts of lips 30 and 31 passively engagable for allow water vapor to pass therethrough. Apparatus 10 is microwave safe, so it may be used for heating food in the microwave.

Figure 4:
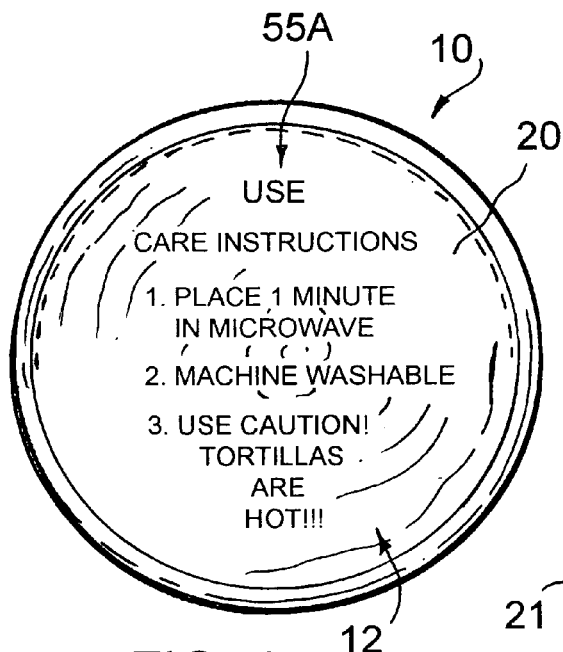
FIG. 4 is a top view of the apparatus of FIG. 1 shown as it would appear equipped with indicia.

The invention has been described above with reference to one or more preferred embodiments. However, those skilled in the art will recognize that changes and modifications may be made in the described embodiments without departing from the nature and scope of the invention. For instance the outer surface of element 20 may be equipped with indicia 55 as shown in FIG. 2, which may comprise advertising indicia or, perhaps, use and care instructions 55A as shown in FIG. 4 and element 21 may also or alternatively be provided with this indicia. Various changes and modifications to one or more of the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. An insulated food container for warming food and keeping food warm and moist comprising:

a bag-like water impermeable pouch defining an internal food-receiving chamber and further defining a food passage opening in communication with the food-receiving chamber, the pouch being closed around a peripheral edge extending from one side of the food passage opening to an opposed side of the food passage opening;

an upper insulating structure including first upper and lower cloth-like layers with a first layer of insulating material sandwiched therebetween, the first upper and lower cloth-like layers defining a first outer edge, and the first upper and lower cloth-like layers being joined and reinforced in a first continuous bead extending completely around the first outer edge;

a lower insulating structure including second upper and lower cloth-like layers with a second layer of insulating material sandwiched therebetween, the second upper and lower cloth-like layers defining a second outer edge, and the second upper and lower cloth-like layers being joined and reinforced in a second continuous bead extending completely around the second outer edge;

the upper insulating structure and the lower insulating structure being positioned in overlying relationship with the pouch sandwiched therebetween, the first outer edge and the second outer edge of the upper insulating structure and the lower insulating structure, respectively, being joined together adjacent the edge of the pouch and coextensive with the closed peripheral edge of the pouch from one side of the food passage opening to the opposed side of the food passage opening without obstructing the food passage opening; and the first continuous bead and the second continuous bead forming upper and lower lips positioned in passive, non-sealing engagement with each other for the extent of the food passage opening to inhibit a build-up of moisture vapor produced from warm food disposed in the food-receiving chamber for preventing warm food disposed in the food-receiving chamber from becoming soggy and to allow enough moisture vapor to remain in the food-receiving chamber for keeping warm food disposed in the food-receiving chamber moist.

2. An insulated food container for warming food and keeping food warm and moist as claimed in claim 1 wherein the edge of the bag-like water impermeable pouch overlies the first continuous bead and the second continuous bead over the food passage opening and forms a portion of the lips.

3. An insulated food container for warming food and keeping food warm and moist as claimed in claim 1 wherein the bag-like water impermeable pouch is formed of one of thin plastic and polyester film.

4. An insulated food container for warming food and keeping food warm and moist as claimed in claim 1 wherein the first upper and lower cloth-like layers and the second upper and lower cloth-like layers each are formed of one of natural and synthetic cloth-like material.

5. An insulated food container for warming food and keeping food warm and moist as claimed in claim 1 wherein the first layer of insulating material and the second layer of insulating material each include one of natural and synthetic insulating material.

6. An insulated food container for warming food and keeping food warm and moist as claimed in claim 1 wherein the food container is constructed microwave safe for placing food in the food-receiving chamber and heating the food in a microwave oven.

7. An insulated food container for warming food and keeping food warm and moist as claimed in claim 1 wherein the bag-like water impermeable pouch is a one-piece structure.

8. An insulated food container for warming food and keeping food warm and moist comprising:

a circular, flat one-piece water impermeable pouch formed of one of thin plastic and polyester film, the water impermeable pouch defining a food-receiving chamber and further defining a food passage opening in an edge of the pouch in communication with the food-receiving chamber;

a round upper insulating structure including first upper and lower cloth-like layers with a first layer of insulating material sandwiched therebetween, the first upper and lower cloth-like layers defining a first circular outer edge, and the first upper and lower cloth-like layers being joined and reinforced in a first continuous bead extending completely around the first circular outer edge;

a round lower insulating structure including second upper and lower cloth-like layers with a second layer of insulating material sandwiched therebetween, the second upper and lower cloth-like layers defining a second circular outer edge, and the second upper and lower cloth-like layers being joined and reinforced in a second continuous bead extending completely around the second circular outer edge;

the upper insulating structure and the lower insulating structure being positioned in coextensive coaxial overlying relationship with the pouch sandwiched therebetween, the first circular outer edge and the second circular outer edge of the upper insulating structure and the lower insulating structure, respectively, being joined together around the periphery from one side of the food passage opening to an opposed side of the food passage opening without obstructing the food passage opening; and the first continuous bead and the second continuous bead forming upper and lower arcuate lips positioned in passive, non-sealing engagement with each other for the extent of the food passage opening to allow passage of food into the food-receiving chamber and to inhibit a build-up of moisture vapor produced from warm food disposed in the food-receiving chamber for preventing warm food disposed in the food-receiving chamber from becoming soggy and to allow enough moisture vapor to remain in the food-receiving chamber for keeping warm food disposed in the food-receiving chamber moist.

9. An insulated food container for warming food and keeping food warm and moist as claimed in claim 8 wherein the edge of the water impermeable pouch overlies the first continuous bead and the second continuous bead over the food passage opening and forms a portion of the lips.

10. An insulated food container for warming food and keeping food warm and moist as claimed in claim 8 wherein the first upper and lower cloth-like layers and the second upper and lower cloth-like layers each are formed of one of natural and synthetic cloth-like material.

11. An insulated food container for warming food and keeping food warm and moist as claimed in claim 8 wherein the first layer of insulating material and the second layer of insulating material each include one of natural and synthetic insulating material.

12. An insulated food container for warming food and keeping food and moist as claimed in claim 8 wherein the food container is constructed microwave safe for placing food in the food-receiving chamber and heating the food in a microwave oven.

13. An insulated food container for warming food and keeping food warm and moist as claimed in claim 8 wherein the water impermeable pouch is a one-piece structure.

14. An insulated tortilla container for warming tortillas and keeping tortillas warm and moist comprising:

a circular, flat one-piece water impermeable pouch formed of one of thin plastic and polyester film, the water impermeable pouch defining a tortilla-receiving chamber and further defining a tortilla passage opening in an edge of the pouch in communication with the tortilla-receiving chamber;

a circular upper insulating structure including first upper and lower cloth-like layers with a first layer of insulating material sandwiched therebetween, the first upper and lower cloth-like layers defining a first circular outer edge, and the first upper and lower cloth-like layers being joined and reinforced in a first continuous bead extending completely around the first circular outer edge;

a circular lower insulating structure including second upper and lower cloth-like layers with a second layer of insulating material sandwiched therebetween, the second upper and lower cloth-like layers defining a second circular outer edge, and the second upper and lower cloth-like layers being joined and reinforced in a second continuous bead extending completely around the second circular outer edge;

the upper insulating structure and the lower insulating structure being positioned in coextensive coaxial overlying relationship with the pouch sandwiched therebetween, the first circular outer edge and the second circular outer edge of the upper insulating structure and the lower insulating structure, respectively, being joined together around the periphery from one side of the tortilla passage opening to an opposed side of the tortilla passage opening without obstructing the tortilla passage opening; and the first continuous bead and the second continuous bead forming upper and lower arcuate lips and the edge of the bag-like water impermeable pouch overlying the first continuous bead and the second continuous bead over the food passage opening and forming a portion of the arcuate lips, the arcuate lips being positioned in passive, non-sealing engagement with each other for the extent of the tortilla passage opening to allow passage of tortillas into the tortilla-receiving chamber and to inhibit a build-up of moisture vapor produced from warm tortillas disposed in the tortilla-receiving chamber.

15. An insulated tortilla container for warming tortillas and keeping tortillas and moist as claimed in claim 14 wherein the tortilla container is constructed microwave safe for placing tortillas in the tortilla-receiving chamber and heating the tortillas in a microwave oven.

\* \* \* \* \*